United States Patent
Talmadge et al.

(10) Patent No.: US 7,119,949 B1
(45) Date of Patent: *Oct. 10, 2006

(54) SYSTEM AND METHOD FOR MEASURING AN AMOUNT OF ERROR ASSOCIATED WITH AN OPTICAL AMPLIFIER

(75) Inventors: Paul C Talmadge, Ansonia, CT (US); Eric B. Saint Georges, Cupertino, CA (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/263,029

(22) Filed: Oct. 31, 2005

Related U.S. Application Data (63) Continuation of application No. 10/894,254, filed on Jul. 19, 2004, now Pat. No. 6,961,172, which is a continuation of application No. 10/209,445, filed on Jul. 30, 2002, now Pat. No. 6,765,714.

(60) Provisional application No. 60/308,940, filed on Jul. 30, 2001.

(51) Int. Cl.
*H01S 3/13* (2006.01)

(52) U.S. Cl. .................. 359/341.4; 359/341.41
(58) Field of Classification Search ............ 359/341.4, 359/341.41
See application file for complete search history.

(56) References Cited

U.S. PATENT DOCUMENTS

| 6,356,386 | B1 | 3/2002 | Denkin et al. |
| 6,417,965 | B1 | 7/2002 | Ye et al. |
| 6,452,722 | B1 | 9/2002 | Krummrich et al. |
| 6,631,027 | B1 | 10/2003 | Gerrish et al. |
| 6,961,172 | B1 * | 11/2005 | Talmadge et al. ....... 359/341.4 |

* cited by examiner

*Primary Examiner*—Mark Hellner
(74) *Attorney, Agent, or Firm*—Baker Botts L.L.P.

(57) ABSTRACT

An optical signal having optical energy is received at an optical amplifier. The optical signal may be separated into a low frequency segment and a high frequency segment. The high frequency segment and the low frequency segment may be processed in order to determine a low frequency error signal and a high frequency error signal. The low frequency error signal may be summed with the high frequency error signal in order to generate a total error change associated with the optical amplifier.

20 Claims, 4 Drawing Sheets

SYSTEM AND METHOD FOR MEASURING AN AMOUNT OF ERROR ASSOCIATED WITH AN OPTICAL AMPLIFIER

RELATED APPLICATIONS

The present application is a continuation application of U.S. application Ser. No. 10/894,254 filed Jul. 19, 2004, now U.S. Pat. No. 6,961,172 issued Nov. 1, 2005, which is a continuation application of U.S. application Ser. No. 10/209,445, filed Jul. 30, 2002, now U.S. Pat. No. 6,765,714 issued Jul. 20, 2004, which claims priority under 35 U.S.C. §119 to U.S. Provisional Application No. 60/308,940 filed Jul. 30, 2001.

TECHNICAL FIELD OF THE INVENTION

This invention relates in general to the field of optical communications and more particularly to a system and method for measuring an amount of error associated with an optical amplifier.

BACKGROUND OF THE INVENTION

Optical network architectures have grown increasingly complex in optical communication systems. Optical communication systems may generally use light waves as a medium for the transmission or the switching of data or information. Many optical communication systems may include an optical amplifier that provides some gain to a corresponding system. Optical amplifiers provide a valuable tool for optical communication systems because of their ability to amplify, regenerate, or otherwise control optical energy to be communicated to a next destination.

One drawback associated with some optical amplifiers is that they may require precise design specifications in order to achieve a designated gain. Optical amplifiers that are improperly designed, such that one or more inaccuracies are produced in the propagation of data or information, may result in inadequate system performance. Often an optical amplifier may be accompanied by one or more monitoring elements that ensure the amplifier input and output are within selected ranges. Optical amplifiers may also be designed to operate at high speeds with the prescribed accuracy. High operational speeds generally result in quicker response times for an associated optical network. Providing an optical amplifier that is highly accurate and stable, while maintaining high operational speeds, presents a significant challenge to designers and manufacturers associated with optical communication systems.

SUMMARY OF THE INVENTION

From the foregoing, it may be appreciated by those skilled in the art that a need has arisen for an improved approach for monitoring one or more parameters associated with an optical amplifier. In accordance with one embodiment of the present invention, a system and method for measuring an amount of error associated with an optical amplifier are provided that substantially eliminate or greatly reduce disadvantages and problems associated with conventional amplifier management techniques.

According to one embodiment of the present invention, there is provided a method for measuring an amount of error associated with an optical amplifier that includes receiving an optical signal that comprises optical energy. The optical signal may be separated into a low frequency segment and a high frequency segment. The high frequency segment and the low frequency segment may be processed in order to determine a low frequency error signal and a high frequency error signal. The low frequency error signal may be summed with the high frequency error signal in order to generate a total error change associated with the optical amplifier.

Certain embodiments of the present invention may provide a number of technical advantages. For example, according to one embodiment of the present invention, an approach for measuring an error associated with an optical amplifier is provided that offers the ability to adjust a 31 (or greater) channel transient. As a result of the detected error, the gain associated with the optical amplifier may be maintained or otherwise controlled by managing power levels provided to the optical amplifier. This management may be executed dynamically at a level 0.05 dBm or greater within the designated optical amplifier gain.

Another technical advantage associated with one embodiment of the present invention is a result of the preciseness in measuring an error associated with an optical amplifier input, output, or gain. The precision in making the measurement determination allows for increased stability of a corresponding optical amplifier, whereby the long-term gain associated with the optical amplifier is maintained at stable levels as a result of the splitting of the control into a high frequency segment and low frequency segment. The low frequency segment may integrate one or more low frequency components of the signal and thus force a long-term error to a result of zero.

Yet another technical advantage associated with one embodiment of the present invention relates to the separation of an optical signal into low frequency and high frequency components. This separation results from the recognition that one or more electronic components within a corresponding optical communication have varying intrinsic qualities. For example, a component or segment associated with a low frequency range may maintain a suitable low offset value (e.g., lower direct current errors due to temperature) but not necessarily maintain good or adequate high frequency characteristics. Conversely, high frequency segments generally may not maintain suitable direct current characteristics. Accordingly, a separation of the high and low frequency components may be used in order to address these limitations and provide for increased accuracy in determining an error associated with the optical amplifier. The separation of the incoming signal into low frequency and high frequency components may further simplify overall operations associated with a corresponding optical communication system while maintaining faster processing times. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
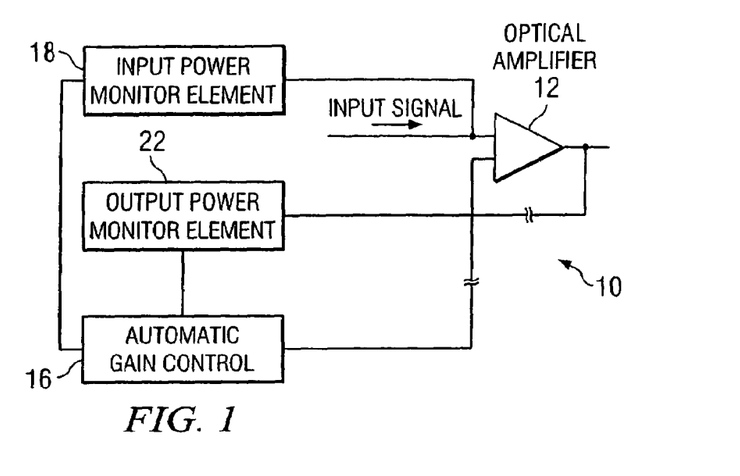
FIG. 1 is a simplified block diagram of an optical communication system for measuring an amount of error associated with an optical amplifier.

FIG. 1 a simplified block diagram of an optical communication system 10 for measuring an amount of error associated with an optical amplifier 12 in accordance with one embodiment of the present invention. FIG. 1 provides an overview of an example arrangement of optical communication system 10 and where appropriate may be designed or constructed using various other configurations in accordance with particular needs. Optical communication system 10 may include optical amplifier 12, an automatic gain control 16, an input power monitor element 18, and an output power monitor element 22. Input power monitor element 18 and output power monitor element 22 may be positioned on a single integrated circuit chip (or multiple integrated circuit chips where appropriate) or alternatively included within a module that may include optical amplifier 12.

Optical communication system 10 may be positioned at any suitable location within or external to an optical network in order to facilitate the delivery, transmission, or switching of optical information or data in an optical communications environment. Where appropriate, optical communication system 10 may be included in a pre-amp segment of an optical network or architecture. An arbitrary input signal may be provided to optical amplifier 12 and selected based on one or more properties associated with a corresponding communications architecture. Alternatively, the input signal may be designated based on one or more parameters associated with any of the elements included within optical communication system 10.

In accordance with the teachings of the present invention, optical communication system 10 operates to provide an element that measures an amount of error associated with optical amplifier 12. In response to the error detection, the gain associated with optical amplifier 12 may be dynamically corrected or otherwise managed at an accuracy that produces a resultant gain substantially similar to the targeted desired gain. In order to achieve significant error detection accuracy, an incoming optical signal may be divided into separate frequency components. The reason for this separation may be due to characteristics of one or more electronic components included within an optical communications architecture. For example, low frequency segments may maintain beneficial low offset values (e.g. low direct current (DC) errors due to temperature) but may not necessarily possess beneficial high frequency characteristics. Conversely, high frequency segments may not have adequate DC characteristics. Accordingly, the separation of high and low frequency components from an optical signal may address one or more issues associated with the limitations of optical components included within an optical communications architecture.

The result of this separation is a configuration that achieves enhanced processing speeds such that a 31-channel transient (or less or greater in accordance with particular communication properties) may be properly adjusted. Optical communication system 10 may operate at a processing speed in the approximate range of $3e^{-6}$ seconds per cycle (or faster) that may ensure that power levels associated with optical amplifier 12 are maintained at a consistent level. Additionally, such an architecture may keep a long-term gain associated with optical amplifier 12 stable due to the splitting of the controls into a high frequency segment and a low frequency segment. The low frequency segment may integrate low frequency components of the signal and the high frequency segment integrates high frequency components of the signal. This division may enable the long term error associated with optical amplifier 12 to reach a zero value and thereby enhance the efficiency of optical communications.

Optical amplifier 12 is an element that receives optical energy and that may use a feedback control loop in order to generate a power output signal. Optical amplifier 12 may detect, regenerate, amplify, or otherwise modify an incoming power signal in order to produce a selected output. Optical amplifier 12 may include one or more corresponding inputs that provide optical energy or adequate feedback to optical amplifier 12. The optical power being directed to optical amplifier 12 may be monitored by input power monitor element 18. Any suitable communicative interface may be provided between optical amplifier 12 and input power monitor element 18. In addition, the optical output of optical amplifier 12 may be monitored or otherwise evaluated by output power monitor element 22. Accordingly, a suitable interface may be provided between output power monitor element 22 and optical amplifier 12 that establishes a suitable communication link.

Optical amplifier 12 may also be referred to as a 'repeater' and may be capable of reproducing an optical signal or any portion thereof generated at any location within an associated optical network. In accordance with one embodiment of the present invention, optical amplifier 12 is an erbium doped fiber amplifier (EDFA). Alternatively, optical amplifier 12 may be any other suitable amplifier, potentially inclusive of a semiconductor material and suitably doped with any other appropriate element in order to properly amplify, manipulate, reproduce, or process an input signal for communication to a suitable next destination. The erbium element within optical amplifier 12 may include state transitions that cause the emission of photons concurrently with the reception of an incoming signal.

The input to optical amplifier 12 may be supplied by one or more pump lasers where appropriate. Alternatively, any other suitable element may provide an adequate input signal to optical amplifier 12. Optical amplifier 12 may make appropriate adjustments to the power provided thereto by cooperating with automatic gain control 16 when a change is experienced in input power. These adjustments to a power input value may be further effectuated with a suitable feedback control loop, potentially inclusive of automatic gain control 16. Such an operation may bring the power output of optical amplifier 12 back to its targeted value and compensate for the change in input power provided to optical amplifier 12.

The changes in input power experienced by optical amplifier 12 may result from an upstream fault of some type within the optical network associated with optical amplifier 12. Optical amplifier 12 or automatic gain control 16 may signal when an error or a failure has occurred such that a suitable input power level may be subsequently supplied to optical amplifier 12.

Automatic gain control 16 is a feedback element operable to receive one or more signals associated with optical amplifier 12 and to provide feedback data such that one or more parameters may be recorded, modified, or otherwise changed in order to generate a predetermined gain associated with optical amplifier 12. There are generally two fundamental gain classes, one that may be used for a physical calibration of an individual optical element or component and one that is representative of the gain of a portion of an optical system architecture associated with a system input and output. The system gain may reflect the optical gain of optical amplifier 12. This gain may be reflected by a ratio of the input signal and the output signal. This may be accomplished by subtracting out the output signal value after it has been scaled down by a multiplying digital to analog converter and further subtracting out the system offset that is representing an amplified stimulated emission (ASE) noise from the input low frequency signal. The result produced may be representative of an integral of a low frequency error signal as described below.

Automatic gain control 16 may compute the instantaneous gain of optical amplifier 12 by using information supplied by input power monitor element 18 or output power monitor element 22. The gain that is computed may be compared with a target or a predetermined gain that is supplied to automatic gain control 16 by any suitable element. Differences between the computed instantaneous gain of optical amplifier 12 and the target gain may be eliminated or otherwise reduced by automatic gain control 16 through adjustment of one or more currents supplied to a corresponding pump laser that feeds optical amplifier 12.

In operation of an example embodiment, optical amplifier 12 may receive a power input and suitably amplify or reproduce the power input such that a predetermined or selected power output is provided. A fraction of the power input may be directed to input power monitor element 18 such that input power monitor element 18 may divide or otherwise evaluate the power being provided to optical amplifier 12. Alternatively, this input power may be monitored by a coupler or any other suitable device operable to receive a power input signal provided to optical amplifier 12. Input power monitor element 18 may then properly separate low frequency and high frequency components from the incoming optical signal. This may enhance the speed of one or more processing cycles such that information or data may be more quickly processed in optical communication system 10. Additional details relating to frequency division operations and phase/amplitude manipulations are provided below with reference to specific circuitry included in each of input power monitor element 18 and output power monitor element 22.

Input power monitor element 18 is an element that includes one or more components operable to separate an incoming optical signal provided to optical amplifier 12 into low frequency and high frequency segments. Input power monitor element 18 includes example circuitry that comprises various electronic components and elements operable to achieve this separation. It is important to note that, where appropriate, these parts may be substituted with other electronic parts arranged in various other configurations in order to achieve a separation of an optical signal into various frequency segments. The embodiments illustrated in FIGS. 2A and 2B have only been offered for purposes of example as numerous other electronic architectures may be employed in accordance with particular needs without departing from the teachings of the invention.

Output power monitor element 22 is an element that includes one or more components operable to assist in separating an incoming optical signal into multiple frequency components. Additionally, output power monitor element 22 may be coupled to an output associated with optical amplifier 12 such that an output power level may be identified or otherwise monitored. Output power monitor element 22 has been illustrated as inclusive of one or more electronic components that provide a monitoring function for the output power provided by optical amplifier 12 and that may assist in the division of an optical signal into high frequency and low frequency segments. Where appropriate, these elements and components may be substituted with other electronic parts arranged in various other appropriate configurations. Additionally, numerous other electronic architectures may be employed in accordance with particular needs without departing from the teachings of the invention. The circuitry provided within output power monitor element 22 has only been offered for purposes of example and should not be construed to limit various other potential implementations of output power monitor element 22.

Input power monitor element 18 and output power monitor element 22 may cooperate in order to provide an enhanced control function that affects optical amplifier 12. This is a result of the separation of an optical signal into high frequency and low frequency segments. This may achieve an accurate, stable, and fast pre-amplifying control system that makes an architecture less likely to lose optical communications traffic. Such an approach may be implemented in order to design a control system that operates at speeds of three microseconds or less in order to adjust to a 32 to 1 channel transient in one embodiment. Optical communication system 10 may operate to keep power levels at an optimal level by adjusting the gain of optical amplifier 12 dynamically to 0.05 dBm of the selected gain. In addition, the long-term gain associated with optical amplifier 12 may be kept stable as a result of the splitting of the amplifier control into a high frequency faction and a low frequency faction.

The implementation of input power monitor element 18 and output power monitor element 22 may also enhance the accuracy in controlling parameters associated with optical amplifier 12. Accuracy is improved by dividing input (and potentially output signals) into separate frequency components. This separation may in turn be beneficial, in part, because low frequency electronic components generally have a specific set of desirable characteristics, such as low offset and low DC errors, that may result from temperature changes in a corresponding system. These characteristics may not necessarily be found in high frequency electronic components. In addition, low frequency electronic components generally do not have certain characteristics often found in high frequency electronic components, such as for example an associated gain at a frequency level of 500 MegaHertz (MHz). Thus, the separation of optical signals within a control system into high and low frequency segments may be effectuated by optical communication system 10 in order to enhance the efficiency and processing capabilities thereof by precisely monitoring one or more parameters associated with optical amplifier 12 such that an error or a change may be identified.

Figure 2A:
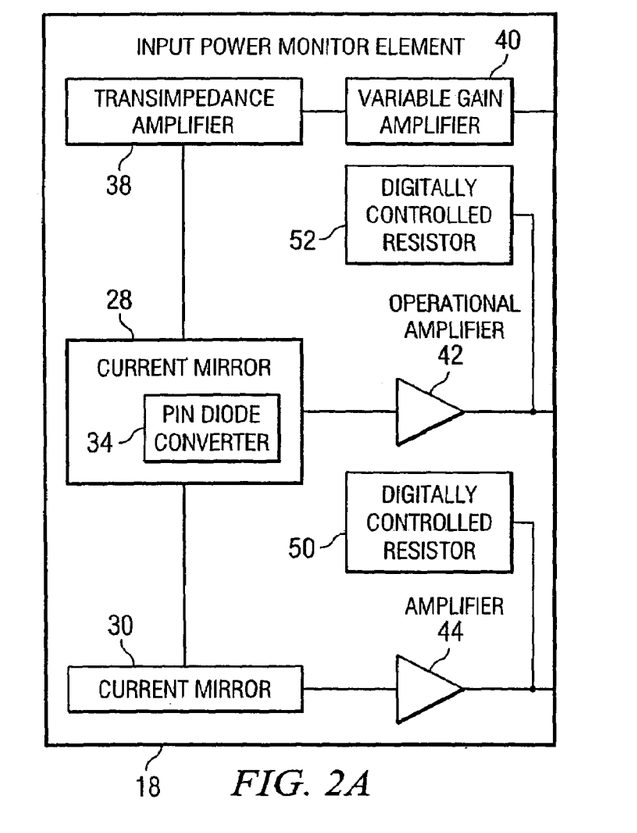
FIG. 2A is a simplified block diagram of an input power monitor element included within the optical communication system.
Figure 2B:
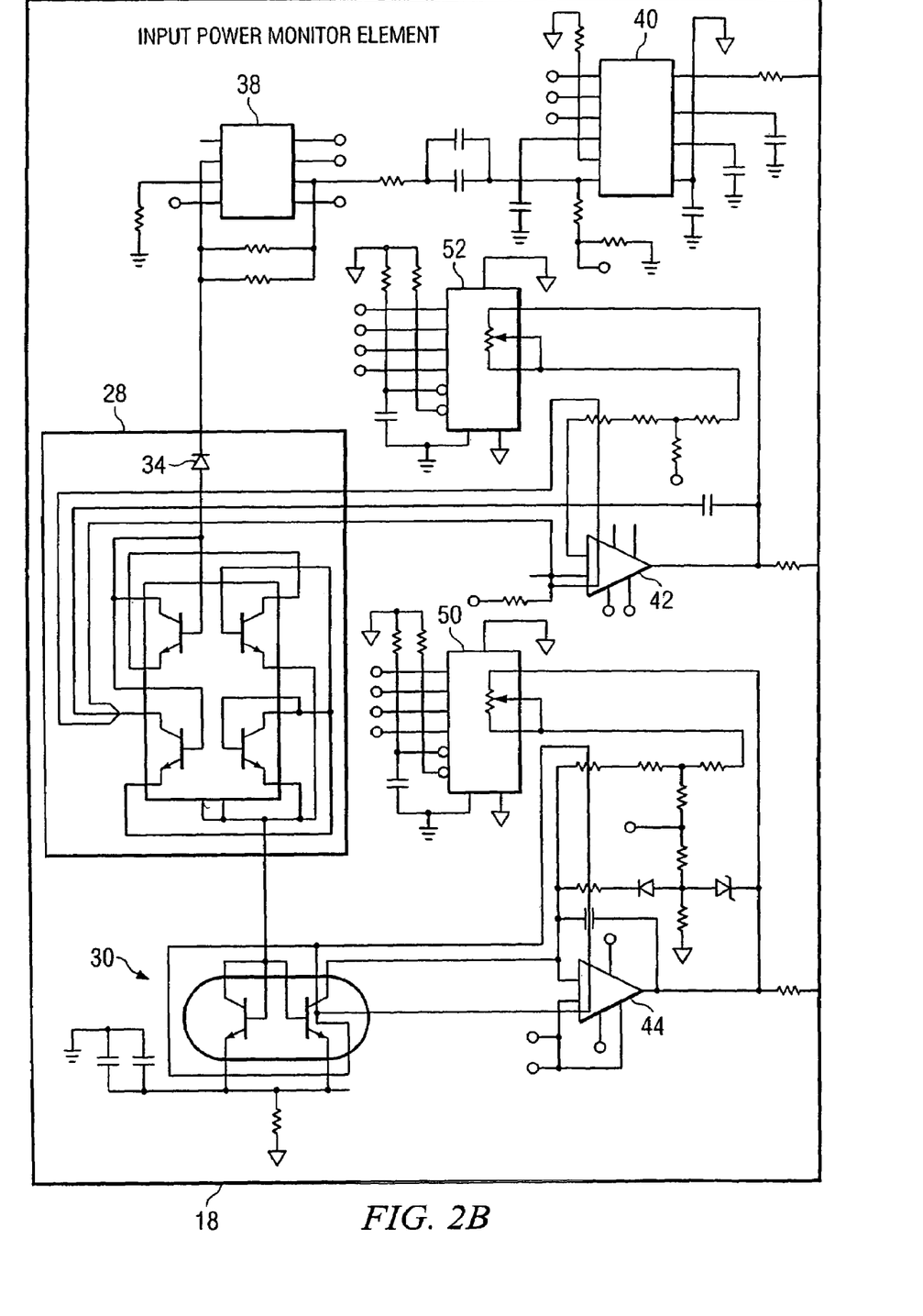
FIG. 2B is a schematic diagram of an example implementation of the input power monitor element of FIG. 2A.

FIG. 2A is a simplified block diagram of input power monitor element 18 included within optical communication system 10. Additionally, FIG. 2B is an example schematic diagram of one implementation of input power monitor element 18. FIG. 2B also provides details relating to example circuitry that may be included within input power monitor element 18. The elements included within input power monitor element 18 may be provided using hardware, software, or any other suitable component, element, or object in accordance with particular needs.

Input power monitor element 18 may include one or more current mirrors 28 and 30 that facilitate the separation of an optical signal into frequency segments. Input power monitor element 18 may also include an optical to electronic pin diode converter 34. Input power monitor element 18 may also include multiple amplifiers 38, 40, 42, and 44 that may be any suitable type of amplifier (e.g. operational amplifier, transimpedance amplifier, etc.) in accordance with particular needs. Input power monitor element 18 may also include a set of digitally controlled resistors 50 and 52.

The elements included within input power monitor element 18 may be coupled to each other in any suitable fashion using any number of various suitable electronic components such as wires, resistors, inductors, capacitors, and any other suitable electronic elements, components, hardware, or software that are operable to facilitate the communication between one or more of these elements. In addition, these elements may cooperate in order to suitably process or otherwise monitor an input power provided to optical amplifier 12. The input power may then be properly separated into high frequency and low frequency segments such that processing speeds may be increased and a suitable gain may be accurately reflected by optical amplifier 12.

In operation, diode converter 34 may measure the input power to optical amplifier 12. The high frequency component of the input power measured by diode converter 34 may be processed through amplifiers 38 and 40. The low frequency component of the input power measured by diode converter 34 may be processed through current mirrors 28 and 30. Current mirrors 28 and 30 may be any suitable current mirror element, such as a Wilson current mirror for example, that maintains a constant voltage across one or more segments of diode converter 34.

Amplifier 38 may be a fixed gain transimpedance amplifier in accordance with one embodiment of the present invention. Alternatively, amplifier 38 may be any other suitable type of amplifier operable to receive or otherwise process information provided by diode converter 34. Amplifier 40 may be a digitally controlled, variable gain, high frequency amplifier. This arrangement creates a variable gain stage that may be used to correct the optical tap coupling variations and the particular responsivity of diode converter 34. Alternatively, amplifier 40 may be any other type of amplifier operable to receive and process optical information or data provided by diode converter 34. The output of the variable gain stage may be coupled in an alternating current (AC) fashion to another amplifier that may buffer the processed signal in the high frequency section of the control system.

As identified above, there are generally two fundamental gain classes, one that may be used for system physical calibration and one that is representative of the entire gain of the system. The calibration gains are identified above in connection with the variable gain stage formed by amplifiers 38 and 40. The system gain reflects the optical gain of optical amplifier 12. This gain may be reflected by a ratio of the input signal and the output signal.

Current mirrors 28 and 30 are electronic configurations that comprise various electronic elements operable to maintain a constant voltage across diode converter 34. By maintaining a constant voltage across diode converter 34, a constant capacitance associated diode converter 34 may also be maintained. In addition, the voltage across diode converter 34 may be kept constant, for example as close as five volts as possible, in order to maintain the smallest capacitance reasonably possible. Current mirrors 28 and 30 may provide this function while allowing one or more operational amplifiers, such as amplifier 42 for example, to be used in a transimpedance configuration, so that current is being systematically converted into a suitable voltage.

Current mirror 28 may feed amplifier 42. Amplifier 42 and gain controlling digitally controlled resistor 52 may together collectively form a variable gain stage. The variable gain stage may be used to correct for the optical tap coupling variations in addition to the responsivity of diode converter 34. The output of this stage may be communicated to a next suitable amplifier that buffers the low frequency summing point for the proportional plus integration (PPI) section of optical communication system 10.

Current mirror 30 may feed amplifier 44. Amplifier 44 and gain controlling digitally controlled resistor 50 may together collectively form a variable gain stage. This variable gain stage may be used to correct for the optical tap coupling variations plus the responsivity of diode converter 34. The output of this stage may be communicated to a suitable amplifying element (and/or its associated circuitry) that may buffer the signal as part of a feed forward portion of a controlled system. In addition, this information may be communicated to the low frequency summing point for the PPI section of the architecture. The output of this stage may be fed into a low frequency amplifier positioned in any suitable element, such as a recovery controller for example, that may be used for loss of signal detection.

Because of the sensitive nature of the operations described that effectuate the division of an incoming signal into high frequency segments and low frequency segments, one or more of the materials included within optical communication system 10 may be specifically selected for their intrinsic characteristics. For example, optical communication system 10 may be suitably mounted on a printed circuit board material for use in connection with additional amplifying elements, where appropriate, that may include a significantly higher surface and bulk resistivity (such as Rogers 4350 printed circuit board stock material for example). The matching of printed circuit board material may provide an insulating benefit given the low signal levels being detected by a corresponding loss of signal detector. In addition, all of the elements described as within input power monitor element 18 and output power monitor element 22 may include guard traces in order to deter stray currents from interfering with one or more signal currents presented in these regions.

Figures 3A, 3B:
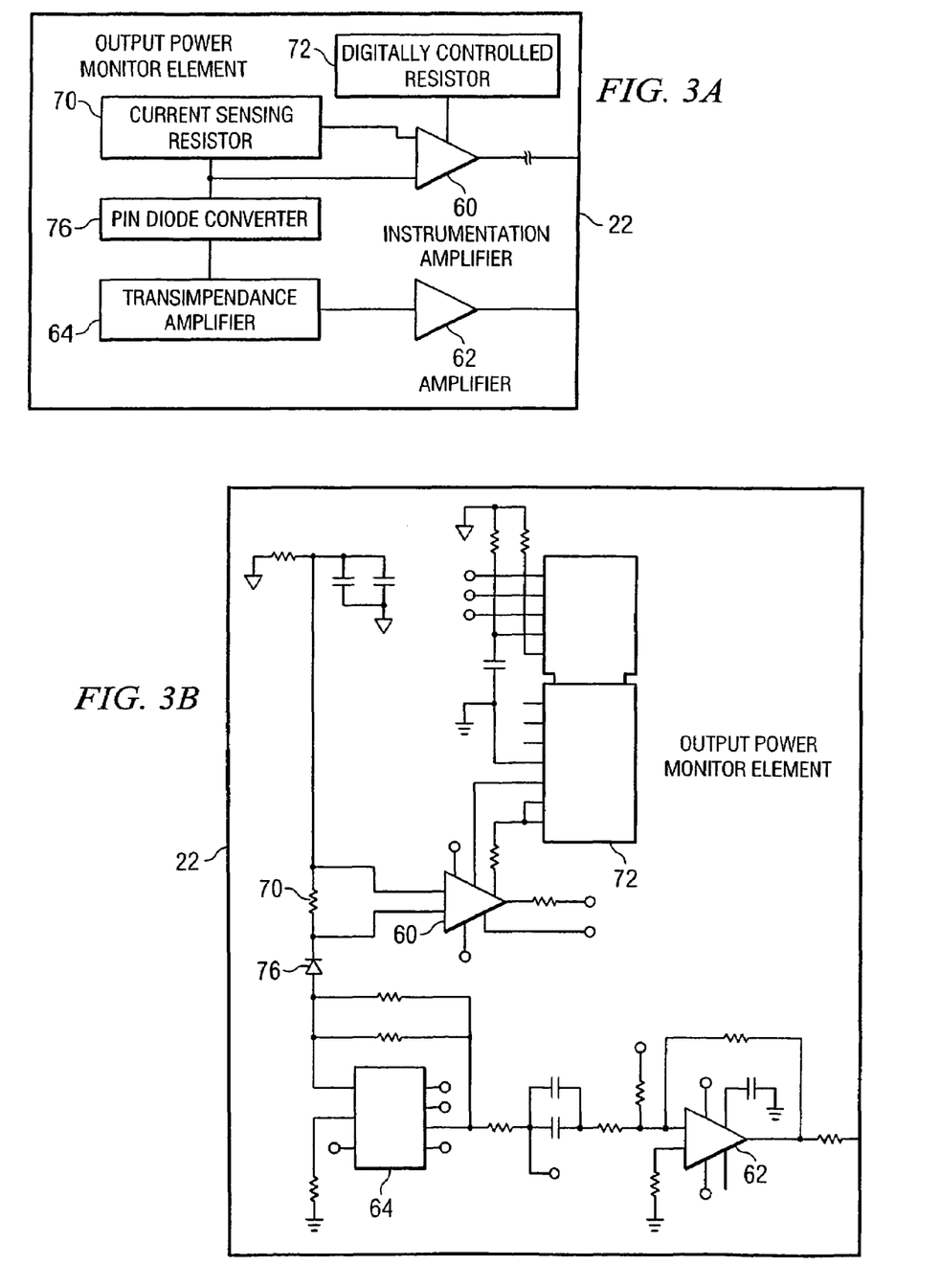
FIG. 3A is a simplified block diagram of an output power monitor element included within the optical communication system.
FIG. 3B is a schematic diagram of an example implementation of the output power monitor element of FIG. 3A.

FIG. 3A is a simplified block diagram of output power monitor element 22 included within optical communication system 10. Additionally, FIG. 3B is an example schematic diagram of one implementation of output power monitor element 22. FIG. 3B also provides details relating to example circuitry that may be included within output power monitor element 22. The elements included within output power monitor element 22 may be provided using hardware, software, or any other suitable component, element, or object in accordance with particular needs.

Output power monitor element 22 may include multiple amplifiers 60, 62, and 64. In addition, output power monitor element 22 may include a current sensing resistor 70 and a digitally controlled resistor 72. Output power monitor element 22 may also include an optical to electronic pin diode converter 76. Where appropriate, these elements may be modified considerably or substituted appropriately in accordance with particular needs of a corresponding system. Additionally, numerous other components may be included within output power monitor element 22 without departing from its operation or its teachings as described herein.

Diode converter 76 may measure the output power from optical amplifier 12. The high frequency component of the output power measured by diode converter 76 may be processed through amplifier 64. Amplifier 64 may be a transimpedance amplifier in accordance with one embodiment of the present invention. However, amplifier 64 may alternatively be any other suitable amplifier where appropriate and in accordance with particular needs. The output power measured by diode converter 76 may be buffered by amplifier 62 after it is received from amplifier 64. The gain control of this signal may be provided to and further managed via a next suitable amplifier.

The low frequency component of the output power measured by diode converter 76 may be processed by current sensing resistor 70. Current sensing resistor 70 may develop a voltage proportional to the current passing through diode converter 76. In addition, the voltage across current sensing resistor 70 may be sensed with amplifier 60. Amplifier 60 may be an instrumentation amplifier in accordance with one embodiment of the present invention. However, amplifier 60 may also be any other suitable type of amplifier where appropriate. The gain of amplifier 60 may be controlled by digitally controlled resistor 72.

The summation and integration of the low frequency input signal, the low frequency output signal, and the offset may be executed at any suitable amplifier. This may be effectuated in a low frequency domain due, in part, to the fact that an integrator should be a low temperature coefficient device. Simultaneously, the high frequency input and output signals may be summed using a high frequency operational amplifier.

High frequency scaling may be accomplished by one or more amplifiers that are controlled by a digitally controlled voltage source. The scaled high frequency output may be subtracted from the high frequency input in order to provide a high frequency error signal. This error signal may then be used by optical communication system 10 in order to manage or otherwise control a gain associated with optical amplifier 12.

The low and high frequency error signals may be added together after they are properly filtered. The low frequency signal may be passed through a low pass filter and the high frequency signal is passed through a high pass filter. The corners of these filters may overlap such that an enhancement of the middle frequencies is executed. An amplifier that is summing these signals may add a lead network characteristic in order to compensate for the lag in the pump laser—optical amplifier 12 combination. Any other additional suitable offsetting value may be added where appropriate and according to particular needs. A final lag may also be added that allows for the control system to pass through a unity gain before the pure delay of the optical fiber associated with the architecture adds too much of a phase shift to the control loop.

The result of this frequency, amplitude, and phase manipulation for the above-described embodiment may be a system that (for example) can track error changes in an optical system to approximately 0.05 dB from a 32 to 1 channel transient. This may result in the precise identification of an error associated with optical amplifier 12. This identification may then result in the ability to control the gain associated with optical amplifier 12. In addition, such an arrangement may provide for the stable management of power provided to optical communication system 10. This error detection configuration is generally not susceptible to lost traffic or inadequate system speed.

Figure 4:
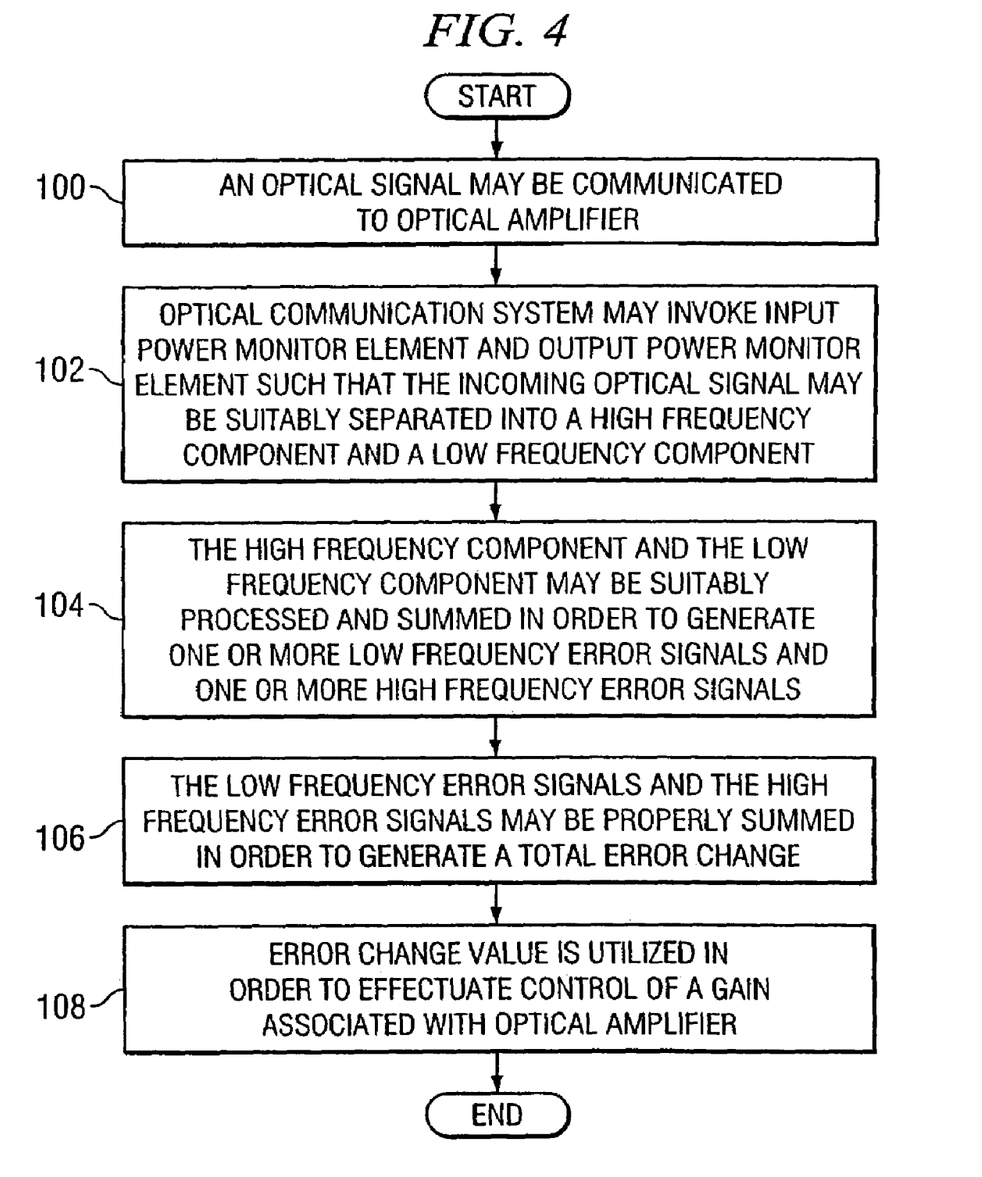
FIG. 4 is a flowchart illustrating a series of example steps associated with a method for measuring an amount of error associated with an optical amplifier.

FIG. 4 is a flowchart illustrating a series of example steps associated with a method for measuring an amount of error associated with optical amplifier 12. The method begins at step 100 where an optical signal may be communicated to optical amplifier 12. At step 102, optical communication system 10 may invoke input power monitor element 18 and output power monitor element 22 such that the incoming optical signal may be suitably separated into a high frequency component and a low frequency component. At step 104, the high frequency component and the low frequency component may be suitably processed and summed in order to generate one or more low frequency error signals and one or more high frequency error signals.

At step 106, the low frequency error signals and the high frequency error signals may be properly summed in order to generate a total error change. The total error change represents the frequency, amplitude, and phase manipulation executed by optical communication system 10. Optical communication system 10 may be capable of accurately tracking error changes associated with a corresponding optical amplifier 12. The error change value may precisely identify an error associated with optical amplifier 12. At step 108, this error change value may then be utilized in effectuating control or otherwise influencing the gain associated with optical amplifier 12 or any other amplifying parameter where appropriate and according to particular needs.

Although the present invention has been described in detail with reference to particular embodiments, it should be understood that various other changes, substitutions, and alterations may be made hereto without departing from the spirit and scope of the present invention. For example, although the present invention has been described with reference to a number of potentially suitable amplifiers, any suitable type of amplifier may be used in the amplifier applications or operations described above. The error detection methods as described above in conjunction with optical communication system 10 may additionally include other applications for feedback loops or optical amplification systems that rely on accurate error determinations for consistent operation or functionality.

In addition, although FIG. 1 illustrates an arrangement of selected elements, numerous other components may be used in combination with these elements without departing from the teachings of the present invention. For example, elements such as optical switches, optical multiplexers, filters, diffraction gratings, couplers, splitters, and numerous other suitable components may be included or coupled to optical communication system 10. The embodiment illustrated in FIG. 1 has only been offered for purposes of teaching and where appropriate may be inclusive of various other suitable components that facilitate the identification of an error associated with a target optical amplifier.

Moreover, although FIGS. 2A–3B have been described with reference to specific electronic elements in various configurations, any suitable architecture may be provided in conjunction with optical communication system 10 without departing from the scope of the present invention. Other appropriate optical architecture components or suitable elements such as resistors, inductors, capacitors, and amplifiers may be included within the illustrated embodiment in any appropriate arrangement. These alternative designs may be provided, designated, or otherwise selected in order to offer specific operational parameters that may in turn influence one or more optical communication operations.

Additionally, although optical communication system 10 describes an appropriate separation of an optical signal into high frequency and low frequency segments, any suitable frequency division may be made. This may be inclusive of multiple frequency divisions that provide a more accurate basis from which to monitor one or more parameters associated with optical amplifier 12.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for measuring an amount of error associated with an optical amplifier, comprising:
    a power monitor element operable to receive at least a portion of an optical signal associated with an optical amplifier, the power monitor element operable to identify a high frequency segment of the optical signal;
    an automatic gain control element operable to receive the high frequency segment of the optical signal identified by the power monitor element, the automatic gain control element operable to control a gain of the optical amplifier in response to the high frequency segment of the optical signal.

2. The apparatus of claim 1, wherein the optical signal associated with the optical amplifier is an input optical signal received by the optical amplifier.

3. The apparatus of claim 1, wherein the optical signal associated with the optical amplifier is an output optical signal generated by the optical amplifier.

4. The apparatus of claim 1, wherein the power monitor element is operable to identify a high frequency segment associated with an input optical signal to the optical amplifier and an output optical signal from the optical amplifier.

5. The apparatus of claim 4, wherein the automatic gain control element is operable to generate a high frequency error signal from the high frequency segments of the input optical signal and the output optical signal.

6. The apparatus of claim 5, wherein the automatic gain control element is operable to determine a total error change in response to the high frequency error signal.

7. The apparatus of claim 6, wherein the total error change is utilized to control the gain of the optical amplifier.

8. The apparatus of claim 1, wherein the power monitor element is operable to identify one or more intermediate frequency segments.

9. The apparatus of claim 8, wherein the automatic gain control element is operable to control a gain of the optical amplifier in response to the high frequency segment and the one or more intermediate frequency segments of the optical signal.

10. The apparatus of claim 1, wherein the automatic gain control element is operable to compare the gain of the optical amplifier to a target gain associated with the optical amplifier.

11. A method for measuring an amount of error associated with an optical amplifier, comprising:
    receiving at least a portion of an optical signal associated with an optical amplifier;
    identifying a high frequency segment of the optical signal;
    controlling a gain of the optical amplifier in response to the high frequency segment of the optical signal.

12. The method of claim 11, further comprising:
    generating the high frequency segment for an input optical signal to the optical amplifier and an output optical signal from the optical amplifier;
    generating a high frequency error signal from the high frequency segments of the input optical signal and the output optical signal.

13. The method of claim 12, further comprising:
    generating the low frequency segment for an input optical signal to the optical amplifier and an output optical signal from the optical amplifier;
    generating a low frequency error signal from the low frequency segments associated with the input optical signal and the output optical signal.

14. The method of claim 13, further comprising:
    combining the low frequency error signal and the high frequency error signal into a total error change associated with the optical amplifier.

15. The method of claim 14, further comprising:
    adjusting the gain of the optical amplifier in accordance with the total error change.

16. A system for measuring an amount of error associated with an optical amplifier, comprising:
    means for receiving at least a portion of an optical signal associated with an optical amplifier;
    means for identifying a high frequency segment of the optical signal;
    means for controlling a gain of the optical amplifier in response to the high frequency segment of the optical signal.

17. The system of claim 16, further comprising:
    means for generating the high frequency segment for the input optical signal to the optical amplifier and the output optical signal from the optical amplifier;
    means for generating a high frequency error signal from the high frequency segments of the input optical signal and the output optical signal.

18. The system of claim 17, further comprising:
    means for generating the low frequency segment for an input optical signal to the optical amplifier and an output optical signal from the optical amplifier;
    means for generating a low frequency error signal from the low frequency segments associated with the input optical signal and the output optical signal.

19. The system of claim 18, further comprising:
    means for combining the low frequency error signal and the high frequency error signal into a total error change associated with the optical amplifier.

20. The system of claim 19, further comprising:
    means for adjusting the gain of the optical amplifier in accordance with the total error change.

* * * * *